(12) United States Patent
Georgy et al.

(10) Patent No.: US 10,469,982 B2
(45) Date of Patent: Nov. 5, 2019

(54) SYSTEM AND METHOD FOR ENHANCED INTEGRATED NAVIGATION WITH WIRELESS ANGLE OF ARRIVAL

(71) Applicant: INVENSENSE, INC., San Jose, CA (US)

(72) Inventors: Jacques Georgy, Calgary (CA); Husain Syed, Calgary (CA)

(73) Assignee: InvenSense, Inc., San Jose, CA (US)

(*) Notice: Subject to any disclaimer, the term of this patent is extended or adjusted under 35 U.S.C. 154(b) by 113 days.

(21) Appl. No.: 14/917,557

(22) PCT Filed: Sep. 9, 2014

(86) PCT No.: PCT/CA2014/000678
§ 371 (c)(1),
(2) Date: Mar. 8, 2016

(87) PCT Pub. No.: WO2015/035501
PCT Pub. Date: Mar. 19, 2015

(65) Prior Publication Data
US 2016/0227366 A1    Aug. 4, 2016

Related U.S. Application Data

(63) Continuation-in-part of application No. 14/130,274, filed on Jun. 27, 2014, now Pat. No. 10,349,286.
(Continued)

(51) Int. Cl.
*H04W 4/02* (2018.01)
*H04W 4/021* (2018.01)
(Continued)

(52) U.S. Cl.
CPC .......... *H04W 4/021* (2013.01); *G01S 5/0257* (2013.01); *G01S 5/12* (2013.01); *G01S 5/04* (2013.01);
(Continued)

(58) Field of Classification Search
CPC ........ G01S 19/48; G01S 19/41; G01S 19/428; G01S 5/0257; G01S 5/12; G01S 5/04; G01S 19/45; H04W 4/021; H04W 4/02
(Continued)

(56) References Cited

U.S. PATENT DOCUMENTS 8,130,141 B2 * 3/2012 Pattabiraman .......... G01S 19/11
342/357.29
9,612,121 B2 * 4/2017 Beermann ............... G01S 19/48
(Continued)

OTHER PUBLICATIONS

Wann et al., "Hybrid TDOA/AOA Indoor Positioning and Tracking Using Extended Kalman Filters", May 2006, IEEE Vehicular Technology Conf. Spring, vol. 3, pp. 1058-1062 (Year: 2006).*
(Continued)

*Primary Examiner* — Un C Cho
*Assistant Examiner* — Shah M Rahman
(74) *Attorney, Agent, or Firm* — Bay Area Technology Law Group PC (57) ABSTRACT

The present disclosure relates to a system and method for integrated navigation integrating wireless measurements including at least angle of arrival (AOA) measurements with a navigation solution. This integrated navigation system provides an enhanced integrated navigation solution of a device within a platform (such as for example person, vehicle, or vessel), wherein the device can be strapped or non-strapped within the platform, wherein the device is non-strapped the mobility of the device may be constrained or unconstrained within the platform, and wherein the device can be tilted to any orientation and still provide a seamless navigation solution without degradation in performance of said navigation solution. The device may include sensors such as for example, accelerometers, gyroscopes, magnetometers, barometer among others. The present system and method can work whether in the presence or in the
(Continued)

absence of absolute navigational information such as, for example, Global Navigation Satellite System (GNSS).

53 Claims, 3 Drawing Sheets

Related U.S. Application Data

(60) Provisional application No. 61/876,562, filed on Sep. 11, 2013.

(51) Int. Cl.
*G01S 5/02* (2010.01)
*G01S 5/12* (2006.01)
G01S 19/48 (2010.01)
G01S 19/41 (2010.01)
G01S 19/45 (2010.01)
G01S 5/04 (2006.01)

(52) U.S. Cl.
CPC ............... *G01S 19/41* (2013.01); *G01S 19/45* (2013.01); *G01S 19/48* (2013.01)

(58) Field of Classification Search
USPC ......................................................... 370/252
See application file for complete search history.

(56) References Cited

U.S. PATENT DOCUMENTS

| | | | | |
|---|---|---|---|---|
| 2005/0243936 A1* | 11/2005 | Agrawala | ............. | H04W 64/00 375/259 |
| 2007/0287473 A1* | 12/2007 | Dupray | ................... | H04W 4/02 455/456.1 |
| 2008/0113672 A1* | 5/2008 | Karr | ........................ | G01S 1/026 455/456.1 |
| 2008/0188236 A1* | 8/2008 | Alles | ....................... | G01S 5/021 455/456.1 |
| 2010/0159958 A1* | 6/2010 | Naguib | ................... | G01S 5/021 455/457 |
| 2010/0323723 A1* | 12/2010 | Gerstenberger | ...... | G01S 5/0226 455/456.5 |
| 2010/0328146 A1* | 12/2010 | Xie | ......................... | G01S 19/42 342/357.25 |
| 2011/0110293 A1* | 5/2011 | Hart | ...................... | G01S 5/0009 370/328 |
| 2011/0159891 A1* | 6/2011 | Segall | ................... | H04W 64/00 455/456.3 |
| 2011/0176434 A1* | 7/2011 | Pandey | ................. | H04W 48/16 370/252 |
| 2012/0009890 A1* | 1/2012 | Curcio | .................... | H04L 29/06 455/230 |
| 2012/0165038 A1* | 6/2012 | Soma | ........................ | G01S 5/08 455/456.1 |
| 2013/0045759 A1* | 2/2013 | Smith | ................... | H04W 4/029 455/456.6 |
| 2013/0285855 A1* | 10/2013 | Dupray | ................... | G01S 19/48 342/451 |
| 2013/0303183 A1* | 11/2013 | Mansour | .............. | G01C 21/005 455/456.1 |
| 2013/0337834 A1* | 12/2013 | Alpert | ................... | H04W 4/008 455/456.1 |
| 2013/0339498 A1* | 12/2013 | Johnson | ................. | H04W 4/02 709/221 |
| 2014/0243025 A1* | 8/2014 | Alsehly | ..................... | G01S 5/14 455/457 |
| 2014/0327581 A1* | 11/2014 | Murphy | .................. | G01S 3/043 342/417 |
| 2015/0056920 A1* | 2/2015 | Huttunen | ................. | H04B 7/26 455/41.2 |
| 2015/0230100 A1* | 8/2015 | Atia | ....................... | H04W 16/18 370/252 |

OTHER PUBLICATIONS

Yousefi et al., "An Improved extended Kalman filter for mobile localization with NLOS anchors", Jul. 2013, Proc. Int. Conf. Wireless Mobile Commun., pp. 25-30 (Year: 2013).*

* cited by examiner

SYSTEM AND METHOD FOR ENHANCED INTEGRATED NAVIGATION WITH WIRELESS ANGLE OF ARRIVAL

TECHNICAL FIELD

The present disclosure relates to a system and method for integrated navigation integrating wireless measurements including at least angle of arrival measurements with a navigation solution.

BACKGROUND

The positioning of a moving platform, such as, vehicles, vessels, or individuals, is commonly achieved using known reference-based systems, such as the Global Navigation Satellite Systems (GNSS). The GNSS comprises a group of satellites that transmit encoded signals to receivers on the ground that, by means of trilateration techniques, can calculate their position using the travel time of the satellites' signals and information about the satellites' current location. Such positioning techniques are also commonly utilized to position a device (such as for example, among others, a mobile phone) within or on the moving platform, whether such device is tethered or non-tethered to the moving platform. Currently, the most popular form of GNSS for obtaining absolute position measurements is the global positioning system (GPS), which is capable of providing accurate position and velocity information provided that there is sufficient satellite coverage. However, where the satellite signal becomes disrupted or blocked such as, for example, in urban settings, tunnels and other GNSS-degraded or GNSS-denied environments, a degradation or interruption (i.e. "gap") in the GPS positioning information can result. As a work around, Assisted Global Positioning System (AGPS) receiver chipsets (in addition to significantly improving the startup performance by utilizing network connection) also further use high sensitivity capabilities to provide absolute positions of the platform even in some environments that cannot guarantee clear line of sight to satellite signals. This results in more availability, however, the quality can be poor for such measurements.

In order to achieve more accurate, consistent and uninterrupted positioning information, GNSS information may be augmented with additional positioning information obtained from complementary positioning systems. Such systems may be self-contained and/or non-reference based systems within the device or the platform, and thus need not depend upon external sources of information that can become interrupted or blocked.

One such non-reference based or relative positioning system is the inertial navigation system (INS). Inertial sensors are self-contained sensors within the device or platform that use gyroscopes to measure rate of rotation/angle, and accelerometers to measure specific force (from which acceleration is obtained). Using initial estimates of position, velocity and orientation angles of the device or platform as a starting point, the INS readings can subsequently be integrated over time and used to determine the current position, velocity and orientation angles of the device and its relative misalignment within the platform. Typically, measurements are integrated once for gyroscopes to yield orientation angles and twice for accelerometers to yield position of the device or platform incorporating the orientation angles. Thus, the measurements of gyroscopes will undergo a triple integration operation during the process of yielding position. Inertial sensors alone, however, are unsuitable for accurate positioning because the required integration operations of data results in positioning solutions that drift with time, thereby leading to an unbounded accumulation of errors.

Further problems in providing accurate position or navigation information about a mobile device can arise where the device is capable of moving freely (e.g. without any constraints) or can move with some constraints within the moving platform. Inaccuracies can arise in such cases because the coordinate frame of the inertial sensors (accelerometers and gyroscopes) of the device is not aligned with the coordinate frame of the moving platform. The device and the moving platform can be misaligned with respect to one another, and such misalignment can change over time. For example, where the device moves freely without constraint, the misalignment of the device and the platform can change without constraint. Where the device is capable of constrained movement, the misalignment of the device and the platform can also change, wherein the change is subject to constraints. Where the mobile device is mounted within the platform, there may still be a misalignment where such mounting results in a misalignment between the coordinate frame of the device and the coordinate frame of the platform (although such misalignment would not change over time). It should be noted that a skilled person would know and understand that the misalignment between a mobile device and a moving platform is different than the misalignment that might occur where a navigation module for positioning a moving platform is positioned incorrectly within the moving platform, thereby resulting in a misalignment between the module and the moving platform.

Given that the positioning techniques described above may suffer loss of information or errors in data, common practice involves integrating the information/data obtained from the GNSS with that of the complementary system(s). For instance, to achieve a better positioning solution, INS and GPS data may be integrated because they have complementary characteristics. INS readings are accurate in the short-term, but their errors increase without bounds in the long-term due to inherent sensor errors. GNSS readings are not as accurate as INS in the short-term, but GNSS accuracy does not decrease with time, thereby providing long-term accuracy. Also, GNSS may suffer from outages due to signal blockage, multipath effects, interference or jamming, while INS is immune to these effects.

Although available, integrated INS/GNSS is not often used commercially for low cost applications because of the relatively high cost of navigational or tactical grades of inertial measurement units (IMUs) needed to obtain reliable independent positioning and navigation during GNSS outages. Low cost, small, lightweight and low power consumption Micro-Electro-Mechanical Systems (MEMS)-based inertial sensors may be used together with low cost GNSS receivers, but the performance of the navigation system will degrade quickly in contrast to the higher grade IMUs in areas with little or no GNSS signal availability due to time-dependent accumulation of errors from the INS.

Speed information from the odometric readings when in vehicle together with other corresponding motion constraints, or pedestrian dead-reckoning in case of walking together with other corresponding motion constraints, may be used to enhance the performance of the MEMS-based integrated INS/GNSS solution or replace the full-INS, however, current such systems continue to be plagued with the growth of errors over time during GNSS outages.

It is important to provide absolute updates to the navigation system that is incorporating inertial sensors especially when GNSS is not present or during long GNSS outages such as indoors or in parkades. Although not dedicated for positioning and navigation, several wireless communication systems are now widely used such as for example wireless local area network (WLAN) commonly referred to as "WiFi", which is heavily deployed in indoor environments. These are signals of opportunity and can be used in positioning. Thus, wireless positioning requires getting information from wireless transceivers at different user locations. Different techniques for wireless positioning might be used, with different accuracies, such as for example, time of arrival, time difference of arrival, angles of arrival, received signal strength, and fingerprinting techniques, among others. Some of the common techniques used for wireless positioning with better accuracies are through wireless information being mapped in databases by deploying pre-surveys of the indoor environments which is then used to estimate the user positions. This is a drawback for these techniques. Some other techniques do not need pre-existing information, but they suffer from decreased accuracy.

Hence, there is a need to provide enhanced positioning performance from an integrated navigation system that utilizes wireless positioning with other sensors and systems, where the wireless positioning does not need pre-existing information such as pre-surveys while still providing improved accuracy.

SUMMARY

The present disclosure relates to a system and method for integrated navigation integrating wireless measurements including at least angle of arrival (AOA) measurements with a navigation solution, for providing an enhanced integrated navigation solution of a device. The wireless system comprises at least one transceiver means, and at least one device for which the navigation solution is obtained.

According to embodiments herein, the wireless measurements include at least wireless angle of arrival measurement of a signal transmitted by at least one transceiver. In some embodiments, the wireless measurements include received signal strength (RSS) measurement of a signal transmitted by at least one transceiver, in addition to the angle of arrival measurement. In some other embodiments, the wireless measurements include time derivative of the RSS measurement of a signal transmitted by at least one transceiver, in addition to the angle of arrival measurement. In some other embodiments, the wireless measurements include RSS measurement and time derivative of the RSS measurement of a signal transmitted by at least one transceiver, in addition to the angle of arrival measurement. In some other embodiments, the wireless measurements include angle of arrival measurement, and at least one other wireless measurement or a combination of wireless measurements, from the at least one transceiver means. The wireless system can be of any type, such as for example, WiFi system among others. The system automatically processes the info that identifies the location of the transceiver. Optionally, the system can rank the transceivers according to the positioning discrimination significance.

The integrated navigation solution may have a motion model such as for example: (i) dead reckoning such as among others Pedestrian dead reckoning (PDR), vehicle dead reckoning, and cycling dead reckoning; (ii) inertial navigation; (iii) integrated inertial navigation with GNSS; (iv) integrated inertial navigation with PDR; (v) integrated inertial navigation with vehicle dead reckoning (using for example an odometer or wheel encoders); (vi) integrated inertial navigation with cycling dead reckoning; (vii) inertial navigation with motion constraints; (viii) inertial navigation with user context aiding; (ix) any combination of the above mentioned navigation systems; or (x) any integrated navigation system.

The integration of the wireless measurements with the navigation solution can be in one of the following manners: (i) loosely coupled; (ii) tightly coupled; (iii) deeply coupled; or (iv) any combination of loosely, tightly and/or deeply coupled. The combination may depend on the accuracies of the navigation system.

In some embodiments, the wireless measurements can be used to provide updates to the navigation solution. The updates can be provided in a loosely coupled manner in which the positions calculated based upon the wireless measurements are used to update the positions calculated by the navigation method.

In some embodiments, a tight integration is also possible in which the wireless measurements are directly used to update the navigation solution instead of the computed positioning solution from the wireless system.

In some embodiments, a deeply coupled integration is used; the navigation solution is used to aid the wireless system, while the wireless measurements are used to provide updates to the navigation solution whether directly (in a similar manner to the tightly coupled integration) or position updates (in a similar manner to the loosely coupled integration) or a combination thereof. In some embodiments where deeply coupled integration is used, the navigation solution or its motion model outcomes are utilized to dynamically build or to assist in building wireless models online, or to online dynamically calculate/estimate either parameters or outputs of the wireless models. In some other embodiments where deeply coupled integration is used, the present integrated navigation solution or its motion model outcomes may be used to verify said online built wireless models from the wireless measurements. The wireless models may be corrected accordingly by changing the parameters used to build the models until an accepted small level of error is obtained. In some of the above embodiments that utilize deeply coupled integration, the wireless system modeling can be used to provide updates to the navigation solution whether directly (in a similar manner to the tightly coupled integration) or position updates (in a similar manner to the loosely coupled integration) or a combination thereof.

The integrated navigation solution can utilize any type of state estimation techniques or filters, whether linear or non-linear, such as for example Kalman filter or Particle filter among others.

In some embodiments, the present system and method further provide a means of estimating or predicting the locations of the at least one wireless transceivers in the wireless network area. In some embodiments, the navigation system and/or the motion model outputs are utilized for the estimation or prediction of the locations of the at least one wireless transceivers in the wireless network area or to assist such estimation or prediction.

In some embodiments, the present system and method further are capable of performing multipath assessment and rejection for the wireless signals and measurements. This multipath assessment and rejection can be performed using the navigation system and/or the motion model outputs.

In some embodiments, the present system and method is further capable of ranking or ordering the at least one transceiver means in the wireless network according to the positioning discrimination significance. The obtained ranking can be further used to estimate the expected error or accuracy measure of the measurements from the corresponding transceiver means, or the position derived therefrom.

In some embodiments, the wirelessly transmitted signals and/or measurements may be pre-processed to reduce or cancel any noise and/or to smooth the measurements, as necessary. The noise cancellation step may be performed using any de-noising, smoothing, or filtering algorithm.

DESCRIPTION OF THE DRAWINGS

FIG. 4 shows an exemplary online measurement table obtained from power patterns transmitted by the transceiver means shown in FIG. 2; and FIG. 5 depicts the signal strength measurements (y-axis) vs. distance (x-axis) from the transceiver means 120A shown in FIG. 2.

DESCRIPTION OF EMBODIMENTS

The present disclosure relates to a system and method for integrated navigation integrating wireless measurements including at least angle of arrival (AOA) measurements with a navigation solution. This integrated navigation system provides an enhanced integrated navigation solution of a device within a platform (such as for example person, vehicle, or vessel), wherein the device can be strapped or non-strapped within the platform, wherein the device is non-strapped the mobility of the device may be constrained or unconstrained within the platform, and wherein the device can be tilted to any orientation and still provide a seamless navigation solution without degradation in performance of said navigation solution. The wireless system comprises at least one transceiver means, and at least one device for which the navigation solution is obtained.

A primary benefit of the present system and method is that they can eliminate the need for pre-surveys of the environments, additional infrastructure, any special messages sent other than the standard protocols already existing. The present system and method can also provide enhanced accuracy, and are capable of assessing and rejecting multipath in wireless signals.

The device is "strapped", strapped down, or tethered to the platform when it is physically connected to the platform in a fixed manner that does not change with time during navigation. In the case of strapped devices, the relative position and orientation between the device and platform does not change with time during navigation. The device is "non-strapped", or non-tethered when the device has some mobility relative to the platform (or within the platform), meaning that the relative position or relative orientation between the device and platform may change with time during navigation. The device may be "non-strapped" in two scenarios: where the mobility of the device within the platform is "unconstrained", or where the mobility of the device within the platform is "constrained". One example of "unconstrained" mobility may be a person moving on foot and having a portable device such as a smartphone in the their hand for texting or viewing purposes (hand may also move), at their ear, in hand and dangling/swinging, in a belt clip, in a pocket, among others, where such use cases can change with time and even each use case can have a changing orientation with respect to the user. Another example where the mobility of the device within the platform is "unconstrained" is a person in a vessel or vehicle, where the person has a portable device such as a smartphone in the their hand for texting or viewing purposes (hand may also move), at their ear, in a belt clip, in a pocket, among others, where such use cases can change with time and even each use case can have a changing orientation with respect to the user. An example of "constrained" mobility may be when the user enters a vehicle and puts the portable device (such as smartphone) in a rotation-capable holder or cradle. In this example, the user may rotate the holder or cradle at any time during navigation and thus may change the orientation of the device with respect to the platform or vehicle.

According to embodiments herein, the wireless measurements include any of the following:
1) AOA measurements from the at least one transceiver means;
2) AOA measurements from the at least one transceiver means and received signal strength (RSS) from the at least one transceiver means;
3) AOA measurements from the at least one transceiver means and the time derivative of the RSS from the at least one transceiver means;
4) AOA measurements from the at least one transceiver means, received signal strength (RSS) from the at least one transceiver means, and the time derivative of the RSS from the at least one transceiver means; or
5) AOA measurements from the at least one transceiver means and at least one measurement or a combination of measurements from the at least one transceiver means.

The wireless system can be of any type, such as for example, WiFi system among others. The system automatically processes the info that identifies the location of the transceiver. Optionally, the system can rank the transceivers according to the positioning discrimination significance.

The device contains one or more wireless antenna. The antenna design may comprise directional antennas, omnidirectional antennas, or a combination of both. The device may contain an antenna structure comprising a plurality of antennas. In some embodiments, beamforming techniques may be used to obtain the angle of arrival from each of the at least one transceiver means.

The integrated navigation solution may have a motion model such as for example: (i) dead reckoning such as among others Pedestrian dead reckoning (PDR), vehicle dead reckoning, and cycling dead reckoning; (ii) inertial navigation; (iii) integrated inertial navigation with GNSS; (iv) integrated inertial navigation with PDR; (v) integrated inertial navigation with vehicle dead reckoning (using for example an odometer or wheel encoders); (vi) integrated inertial navigation with cycling dead reckoning; (vii) inertial navigation with motion constraints; (viii) inertial navigation with user context aiding; (ix) any combination of the above mentioned navigation systems; or (x) any integrated navigation system.

Figure 1:
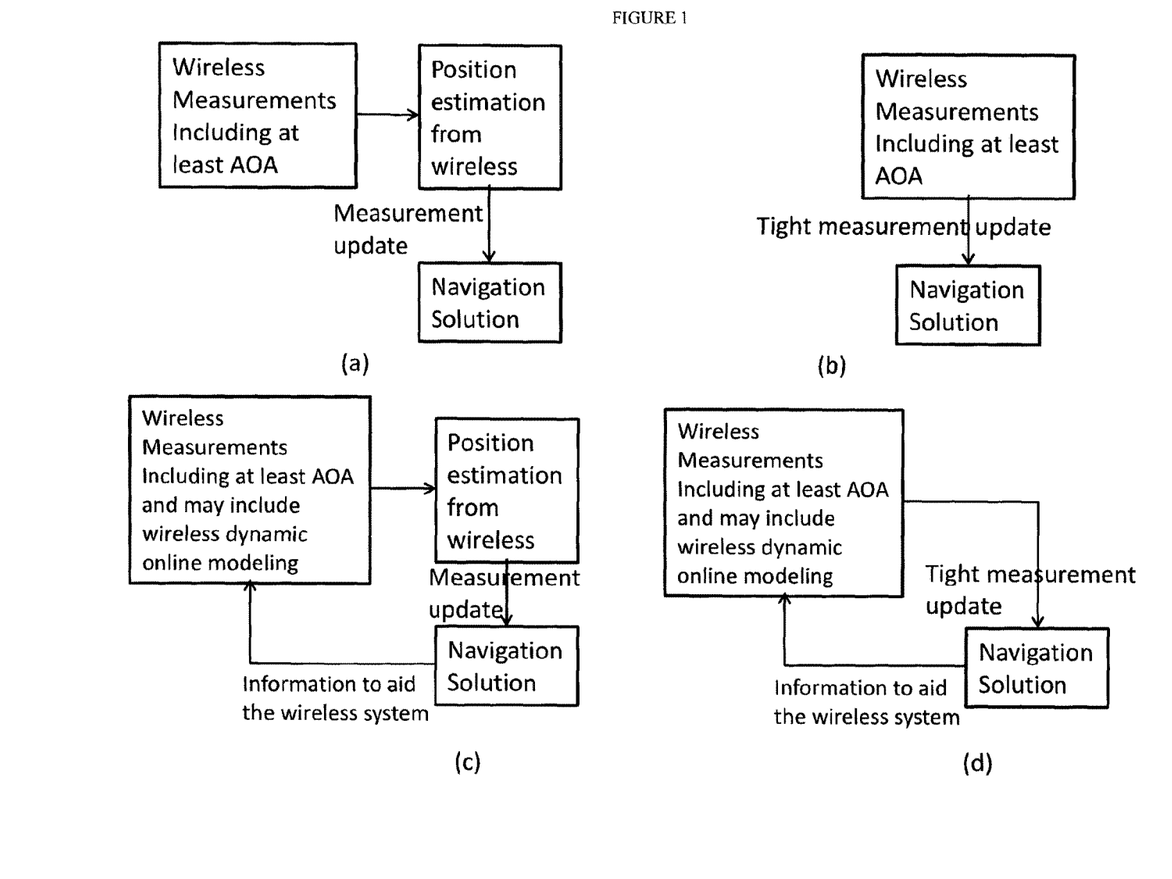
FIG. 1 shows block diagrams of some embodiments of the present method having loosely coupled integration (a), tightly coupled integration (b), deeply coupled integration (c), or another embodiment for deeply coupled integration (d)
Figure 2:
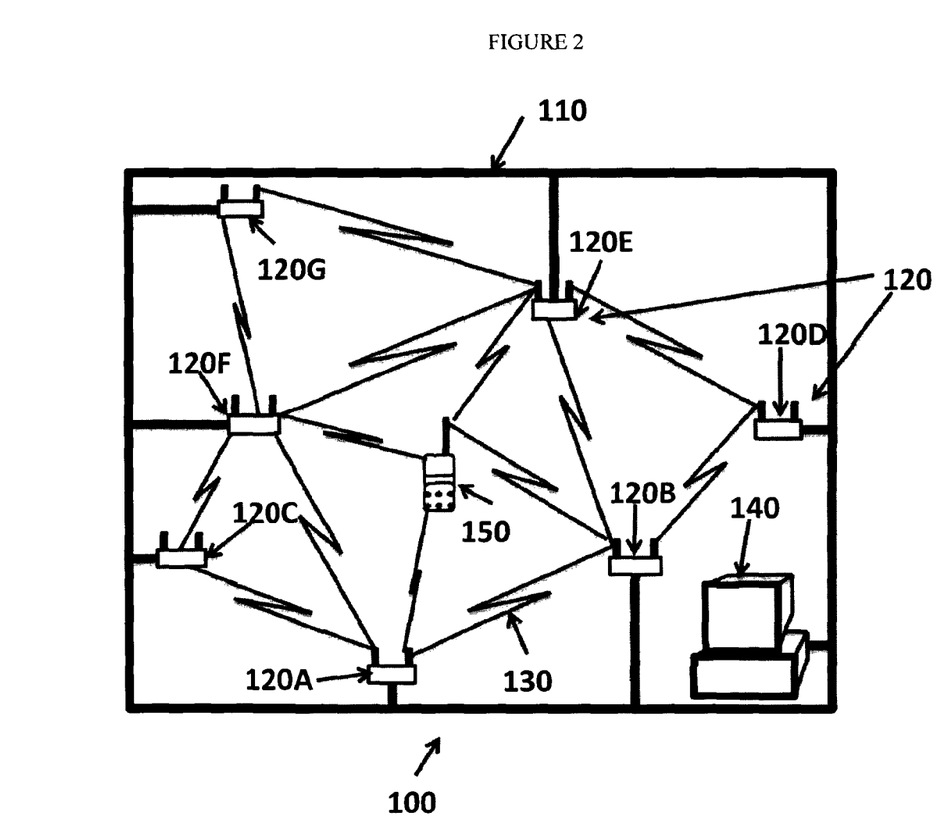
FIG. 2 shows an example of a WLAN area.
Figure 3:
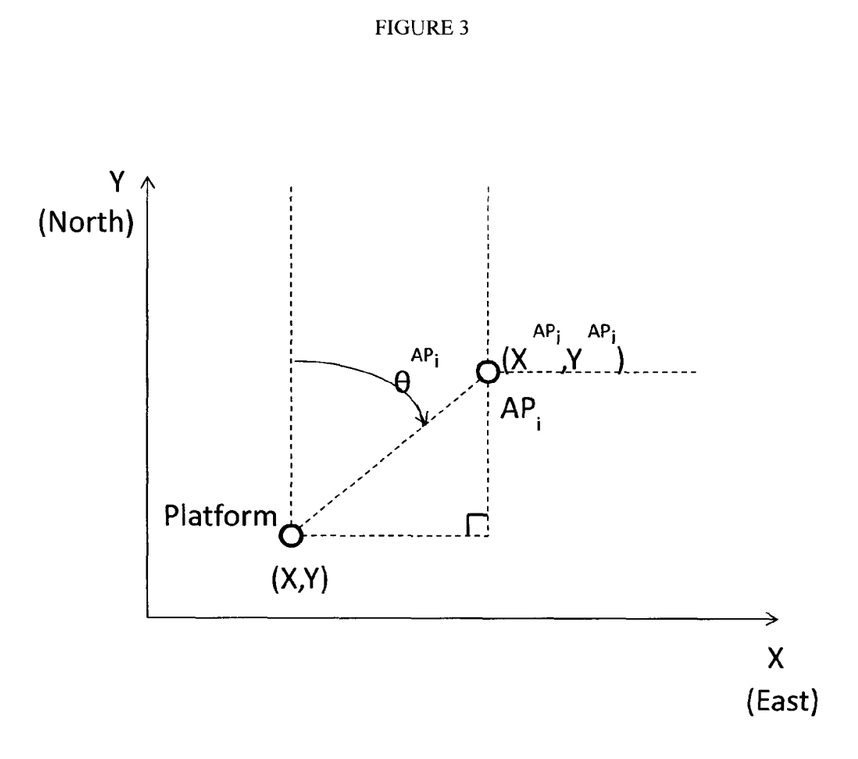
FIG. 3 shows an exemplary diagram of the geometry between the platform carrying the device and a transceiver means (said transceiver means being an access point as an example).

The integration of the wireless measurements with the navigation solution can be in one of the following manners: (i) loosely coupled; (ii) tightly coupled; (iii) deeply coupled; or (iv) any combination of loosely, tightly and/or deeply coupled. The combination may depend on the accuracies of the navigation system. FIG. 2 shows block diagrams of some embodiments of the present method. FIG. 1(a) shows a block diagram for one embodiment of the present method when using loosely coupled integration. FIG. 1(b) shows a block diagram for one embodiment of the present method when using tightly coupled integration. FIG. 1(c) shows a block diagram for one embodiment of the present method when using deeply coupled integration, wherein position from the wireless model is used as update for the navigation solution. FIG. 1(d) shows a block diagram for one embodiment of the present method when using another option for deeply coupled integration, wherein wireless measurements are used directly to update the navigation solution.

In some embodiments, the wireless measurements can be used to provide updates to the navigation solution. The updates can be provided in a loosely coupled manner in which the positions calculated based upon the wireless measurements are used to update the positions calculated by the navigation method. In some embodiments, the positions calculated based upon the wireless measurements may be calculated using standalone filtering or estimation techniques, standalone means separate from the navigation solution. In some embodiments, the positions calculated based upon the wireless measurements may be calculated using a measurement-based estimation technique (which does not rely on a system model but rather on measurement only) and possibly an accuracy measure for such position. Examples of such measurement-based estimation techniques to use are Maximum Likelihood-based techniques (that maximize the likelihood of the observation) or Least Squares-based techniques.

In some embodiments, a tight integration is also possible in which the wireless measurements are directly used to update the navigation solution instead of the computed positioning solution from the wireless system. The wireless measurements, such as the angles of arrival or the RSS, or quantities derived from the wireless measurements such as the distance or range obtained from the RSS, the time derivative of RSS, or the range rate derived from the time derivative of RSS can be used.

In some embodiments, a deeply coupled integration is used; the navigation solution is used to aid the wireless system (so that the wireless system can provide better measurements), while the wireless measurements are used to provide updates to the navigation solution whether directly (in a similar manner to the tightly coupled integration) or position updates (in a similar manner to the loosely coupled integration) or a combination thereof. In some embodiments where deeply coupled integration is used, the navigation solution or its motion model outcomes are utilized to dynamically build or to assist in building wireless models online, or to online dynamically calculate/estimate either parameters or outputs of the wireless models. In some embodiments once the online modeling and/or estimation are completed, the deep integration may be mainly aiding the integrated navigation solution, in some other embodiments both the navigation solution and the wireless modeling can be aiding each other. In some other embodiments where deeply coupled integration is used, the present integrated navigation solution or its motion model outcomes may be used to verify said online built wireless models from the wireless measurements. The wireless models may be corrected accordingly by changing the parameters used to build the models until an accepted small level of error is obtained. In some of the above embodiments that utilize deeply coupled integration, the wireless system modeling can be used to provide updates to the navigation solution whether directly (in a similar manner to the tightly coupled integration) or position updates (in a similar manner to the loosely coupled integration) or a combination thereof.

Any combination of loosely, tightly and/or deeply coupled integration scheme may be used as well. The combination may depend on the accuracies of the navigation system.

A filtering or state estimation technique, whether linear or nonlinear, can be used to perform the present integration. In case the underlying motion models and/or the wireless models are non-linear, either: (i) linearized models are used with linear integration techniques, such as for example the Kalman filter (KF), Linearized KF, or Extended KF, or (ii) any non-linear integration technique such as for example, particle filter, genetic algorithm, neural network, among others may be used directly, eliminating the need of linearization.

The integrated navigation solution and the motion models it may comprise can be any one of the following, among others:

1) Integration of wireless system modeling with dead reckoning: Dead reckoning refers to estimating a new set of positioning information based on a previous set of positioning solution.
   a. Where the moving platform is a pedestrian, the dead reckoning is referred to estimating the new position of the user at every step. The stride length and the heading of the user are used to get the change in position, which is then added to the previous position.
   b. Where the moving platform is a vehicle or robot, for example, the dead reckoning can make use of vehicle speed with the heading information to propagate the previous position to the new location. Dead reckoning provides relative positions; however, the errors accumulate with respect to time.
   c. Where the moving platform is a cycling platform, for example, the dead reckoning can be achieved whether for strapped sensors such as odometers or wheel encoders or with portable devices that may not have any connection to strapped sensors on the bicycle body. The former gets the bicycle speed from the strapped sensors while the latter should run a routine to detect pedaling, then detect cycles, and have or build models that estimate traveled distance and/or speed as a function of the detected cycles and their frequencies. That information together with the heading information are used to propagate the previous position to the new location. Dead reckoning provides relative positions; however, the errors can accumulate with respect to time.

2) Integration of wireless system modeling with inertial navigation: inertial navigation uses mechanization equations to compute a relative navigation solution. This solution drifts with time due to integration of errors through mechanization equations. The present wireless system models or the outcome thereof can be used as updates to limit the drift errors.

3) Integration of wireless system modeling with integrated inertial navigation with GNSS: Integrated inertial navigation with GNSS can be used as a solution to bridge short GNSS outages. Any long indoor duration will result in accumulation of errors. The present wireless system models or the outcome thereof can be used as updates to limit the drift errors for long GNSS outage durations.

4) Integration of wireless system modeling with integrated inertial navigation with PDR (both with and without GNSS): For long indoor trajectories, the PDR can be used as updates to the inertial navigation. Such updates, although relative, reduces the errors in the position directly, and indirectly reduces the errors in other navigation parameters. Such integrated system still has a need for absolute updates from wireless system models or the outcome thereof to limit the drift errors (e.g. in cases where GNSS is not present or during GNSS outages).

5) Integration of wireless system modeling with integrated inertial navigation with vehicle dead reckoning (both with and without GNSS): Inertial navigation can significantly improve if vehicle dead reckoning is used for updates. Such a system can maintain reliability over long durations. However, the underlying drifts will still make the overall positioning solution unreliable unless absolute updates become available. The absolute updates can be from wireless system modeling in the absence of GNSS updates. This situation can be used in indoor parking lots or long tunnel systems for vehicles or indoors for robots, where the wireless system models or the outcome thereof can mitigate the drift in the navigation solution.

6) Integration of wireless system modeling with integrated inertial navigation with cycling dead reckoning (both with and without GNSS): Inertial navigation can significantly improve if cycling dead reckoning is used for updates. Such a system can maintain reliability over long durations. However, the underlying drifts will still make the overall positioning solution unreliable unless absolute updates become available. The absolute updates can be from wireless system modeling in the absence of GNSS updates. This situation can be used in indoor parking lots or long tunnel systems for bicycles, where the wireless system models or the outcome thereof can mitigate the drift in the navigation solution.

7) Integration of wireless system modeling with inertial navigation with motion constraints (both with and without GNSS): Motion constraints are useful to limit the integration error and may be implemented with the inertial navigation. Such system still needs absolute updates to keep the drifts within acceptable levels. Integration with wireless system models or the outcome thereof is one of the means for minimizing the drift errors (e.g. in cases where GNSS is not present or during GNSS outages).

8) Integration of wireless system modeling with inertial navigation with user context aiding (both with and without GNSS): In the absence of any other information, the inertial navigation can rapidly become useless (e.g. in a of seconds). If available, user context information can aid the inertial navigation to limit the growth of errors, however, integration with wireless system models or the outcome thereof is needed to mitigate the drift in the navigation solution (e.g. in cases where GNSS is not present or during GNSS outages).

9) Integration of wireless system modeling with any combination of the above mentioned navigation systems: the present wireless system models or the outcome thereof can be integrated with any combination of the above mentioned navigation solutions/systems, enabling decreased and mitigated drift in the navigation solution.

10) Integration of wireless system modeling with any integrated navigation system: the wireless system models or the outcome thereof can be integrated with any navigation solution/system, enabling decreased and mitigated drift in the navigation solution.

The present wireless system can be operable in a wireless network-enabled area (e.g. an area covered by a wireless network infrastructure), such as for example an area having wireless local area network (WLAN) coverage. FIG. 2 shows an embodiment of the present system 100 comprising a wireless network having at least one transceiver means 120 capable of and/or receiving a wireless signal. In some embodiments, the wireless network may be the known IEEE 802.11 WLAN known as "Wi-Fi", and the at least one transceiver means may comprise Wi-Fi access points (APs), which may or may not be fixed in one particular location within the targeted area. In some embodiments, the at least one wireless transceiver may be capable of acting as a gateway between the wireless network and a wired network 110.

The at least one transceiver means may transmit a wireless signal comprising information identifying the at least one transceiver along with other information in the signal or that can be obtained from the signal such as for example the signal strength thereof. Where the location information of the at least one transmitting transceiver means is embedded in the information identifying the at least one transceiver, the location may be obtained by decoding this information. Alternatively, the location may be obtained by looking up the information in a table containing the locations of the at least one transceivers indexed by an identification information of the at least one transceiver means (such as for example the Media Access Control (MAC) address). The table may be saved, and can be updated manually or automatically whenever changes occur to the number and/or location of the at least one transceiver means within the area.

As discussed earlier, the wireless measurements are integrated with navigation systems and the integration scheme may be loosely coupled, tightly coupled, or deeply coupled, or a combination thereof. In the case where loosely coupled integration is used, the wireless measurements are used to obtain a positioning solution and optionally an accuracy measure thereof, as discussed earlier. This accuracy measure may be used (such as for example as a standard deviation) for the position update from wireless positioning to the navigation system. In case where tightly coupled integration is used, an expected error or accuracy measure may be calculated with the wireless measurements and may be further used as an accuracy measure (such as for example a standard deviation) affecting or contributing to the tight wireless update to the navigation system. In the case where deeply coupled integration is used, the expected error or accuracy measure calculated with the wireless measurements or the wireless positioning may be further used as an accuracy measure (such as for example a standard deviation) affecting or contributing to the wireless update to the navigation system.

In the case where deeply coupled integration is used, as mentioned earlier the navigation system aids the wireless system itself to provide better measurements, while the wireless system is aiding the navigation system as well.

In some embodiments, and in the case where deeply coupled integration is used, the present navigation system or its motion model outcomes may be utilized to dynamically build or to assist in building wireless models online for the wireless measurements discussed earlier, or to online dynamically calculate/estimate either parameters or outputs thereof. In some other embodiments, and in the case where deeply coupled integration is used, the present navigation system or its motion model outcomes may be used to verify said online built wireless models for the wireless measurements. The wireless models may be corrected accordingly by changing the parameters used to build the models until an accepted error is obtained.

In some embodiments, the wirelessly transmitted signals and/or measurements may be pre-processed to reduce or cancel any noise and/or to smooth the measurements, as necessary. The noise cancellation step may be performed using any de-noising, smoothing, or filtering algorithm.

In some embodiments, the present system and method further provide a means of estimating or predicting the locations of at the least one wireless transceivers in the wireless network area using the navigation system and/or the motion model outputs. This may be useful where the wireless positioning system is to be used in an unknown wireless network area that would typically require the use of pre-existing knowledge about the locations of the at least one transmitting means that constitute the wireless infrastructure. This may also be useful in circumstances where the wireless network area is an unknown area and the locations of the transmitting means that constitute the wireless infrastructure are not known.

In some embodiments, the present system and method is further capable of ranking or ordering the at least one transceiver means in the wireless network according to the positioning discrimination significance. The obtained ranking can be further used to estimate the expected error or accuracy measure of the measurements from the corresponding transceiver means, or the position derived therefrom. For example, the ranked transceiver means can be divided into groups such as ("high quality", "medium quality", "low quality") and then based on the quality group that the majority of transceiver means used belong to, an accuracy measure can be determined. In another example, the ranks of the transceiver means can be seen as weights and the accuracy measure corresponding to the used group of transceiver means can be a weighted average of individual accuracy measures of the used transceiver means.

The present system and method may improve the performance of the integration of the wireless measurements discussed earlier with the navigation system by either using only the measurements form a most significant group among the available transceiver means to be integrated with the navigation system, thereby reducing the effects of signal noises and redundancies resulting from including insignificant transceiver means.

It is understood that while the transmitting means are referred to herein as transceiving means, the transmitting means need not necessarily be a transceiver means comprising a receiving means.

Contemplated Embodiments

It is contemplated that the present system and method can be combined with a mode of conveyance technique or a mode detection technique to establish the mode of conveyance. This enables the discrimination of different scenarios such as for example walking, running, cycling and in vessel (car, bus, train, . . . ) among other possible modes.

It is further contemplated that the present method and apparatus can be used with a navigation solution that may optionally utilize automatic zero velocity periods or static period detection with its possible updates and inertial sensors bias recalculations, non-holonomic updates, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that the present method and apparatus can be used with a navigation solution that is further programmed to run, in the background, a routine to simulate artificial outages in the absolute navigational information and estimate the parameters of another instance of the state estimation technique used for the navigation solution of the present disclosure to optimize the accuracy and the consistency of the navigation solution. The accuracy and consistency is assessed by comparing the temporary background solution during the simulated outages to a reference solution. The reference solution may be one of the following examples: the absolute navigational information (e.g. GNSS), the forward integrated navigation solution in the device integrating the available sensors with the absolute navigational information (e.g. GNSS) and possibly with the optional speed or velocity readings, a backward smoothed integrated navigation solution integrating the available sensors with the absolute navigational information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation.

It is further contemplated that the present method and apparatus can be used with a navigation solution that is further integrated with maps (such as street maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the present method and apparatus can be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be capable of relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

It is contemplated that the present method and apparatus can be used with various types of inertial sensors, other than MEMS based sensors described herein by way of example.

Without any limitation to the foregoing, the present method is further described by way of the following examples.

EXAMPLES

Example 1

Example of Equations Used as Measurement Models for the Wireless Measurement Described Herein The coordinates used here for demonstration are Cartesian and are referenced to a starting point within a local level frame, the coordinates then could be for example East, North, Up from an initial latitude, longitude, and altitude (this initial point is the origin of the Cartesian coordinate frame under consideration). Since usually in navigation systems latitude, longitude, and altitude are the position coordinates used in the majority of navigation systems, the conversion between this coordinate system and the local Cartesian system used here for demonstration is as follows:

$$North_k = (\varphi_k - \varphi_0)*(M+h_0)$$

$$East_k = (\lambda_k - \lambda_0)*(N+h_0)*\cos(\varphi_0)$$

where M is the Meridian radius of curvature of the Earth's ellipsoid and N is the normal radius of curvature of the Earth's ellipsoid. To simplify the terminology x, and y are interchangeably used with East, and North.

The platform or user coordinates at time step k will be referred to as $(x_k, y_k)$, this may be obtained by the integrated navigation solution that uses accelerometers, gyroscopes, and if available, magnetometers and barometer, together with absolute navigation information such as GNSS (which may be obstructed if indoor, but it already helped the solution and sensor-error estimation when it was available). The $i^{th}$ AP coordinates will be referred to as $(x_k^{AP_i}, y_k^{AP_i})$. As mentioned earlier, a possible way to obtain the access point coordinates is through a search in a reference database that contains the locations of all wireless access points to determine the locations of each access point from which the RSS was measured. The platform or user velocity at time step k will be referred to as $(v_{x,k}, v_{y,k})$.

As per the geometry in FIG. 1, the angle of arrival from the $i^{th}$ AP at time step k, $\theta_k^{AP_i}$, is related to the position coordinates as follows:

$$\theta_k^{AP_i} = a\tan 2(x_k^{AP_i} - x_k, y_k^{AP_i} - y_k) \quad (1)$$

The RSS from the $i^{th}$ AP at time step k, $RSS_{i,k}$, may be related to the position coordinates using any relevant general mathematical formulae, including, without limitation, the common logarithmic decay formula given by:

$$RSS_{i,k} = RSS_i^0 - 10n_i \log_{10}\left(\frac{\left((x_k^{AP_i} - x_k)^2 + (y_k^{AP_i} - y_k)^2\right)^{\frac{1}{2}}}{d_i^0}\right) \quad (2)$$

where $RSS_i^0$ is a reference received signal strength RSS from the $i^{th}$ AP measured at known distance $d_i^0$ from the $i^{th}$ AP and $n_i$ is a path-loss exponent.

The time rate of change of the RSS of the $i^{th}$ AP at time step k, $$\left.\frac{dRSS_i}{dt}\right|_k,$$

may be related to the coordinates and velocity using any relevant general mathematical formulae, including, without limitation, the formula obtained from the time derivative of equation 2, as follows:

$$\left.\frac{dRSS_i}{dt}\right|_k = \frac{10n_i}{\ln(10)}\left(\frac{(x_k^{AP_i} - x_k)(v_{x,k}) + (y_k^{AP_i} - y_k)(v_{y,k})}{\left((x_k^{AP_i} - x_k)^2 + (y_k^{AP_i} - y_k)^2\right)}\right) \quad (3)$$

By way of example, the value of the time rate of change of the RSS of the $i^{th}$ AP at time step k, $$\left.\frac{dRSS_i}{dt}\right|_k,$$

may be calculated from the RSS values numerically by formulas that calculate discrete derivative, these numerical formulas can be of any order in time (i.e. with any memory length in the discrete domain) to calculate better and more smooth derivatives. Low pass filtering can be applied first to the RSS values before using them to calculate the derivative, or alternatively any other de-noising techniques can be used.

One benefit of relying on the time rate of change of the RSS values rather than the RSS values themselves is alleviating any biasing effects in the RSS measurements.

Since, in general, several APs are visible to the platform or user carrying the device (for example N APs are visible), then the used measurements (such as AOA, RSS, time derivative of RSS) of all these APs are used with a measurement model comprising N equations for each measurement, an equation for each AP per measurement.

These measurement models are nonlinear, so either nonlinear techniques are used or the models are linearized to be used with linear techniques. Nonlinear techniques may have an advantage with such nonlinear measurement models.

From equations 1, 2, and 3, equations relating the accuracy measures of the measurements to the accuracy measures of the position coordinates and velocity may be obtained.

In case loose integration scheme is used to integrate the wireless measurements with a navigation solution, the measurement models described in this example can be used with standalone filtering or estimation techniques (separate from the navigation solution) to obtain positions and then these positions are used to update the positions calculated by the navigation solution.

In case tight integration scheme is used to integrate the wireless measurements with a navigation solution, the measurement models described in this example are used in the filtering or estimation techniques of the navigation solution as measurement updates.

In case deep integration scheme is used to integrate the wireless measurements with a navigation solution, the navigation solution aids the wireless system itself so that the wireless system can provide better measurements, while the wireless system is aiding the navigation system as well whether in a manner similar to the tight scheme, the loose scheme, or a combination thereof. The measurement models described in this example are then used as described above depending on the scheme of the wireless system aiding.

Any combination of loosely, tightly and/or deeply coupled integration scheme may be used as well. The combination may depend on the accuracies of the navigation system. The accuracy measures may be used as described earlier.

The embodiments and techniques described above may be implemented as a system or plurality of systems working in conjunction, or in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processor enabled devices in communication with the device, such as a server or other devices.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

The embodiments in which an exclusive property or privilege is claimed are defined as follows:

1. A method for integrating measurements from a wireless system comprising at least angle of arrival measurement(s) with a navigation solution about at least one wireless-enabled device, wherein the wireless system comprises at least one transceiver means at any location within a wireless network area, wherein the at least one transceiver is configured to transmit wireless signal(s), wherein the measurements of the wireless system are generated from the signal(s), wherein the at least one device is configured to receive the signal(s) from the at least one transceiver means and wherein the at least one device comprises motion sensors, the method comprising:
   a. receiving the signal(s) transmitted from the at least one transceiver means, and generating the wireless measurements comprising the angle of arrival measurement(s) from the received signal(s),
   b. obtaining information from the transmitted signal(s) that identifies the at least one transceiver means,
   c. integrating the wireless measurements comprising the angle of arrival measurement(s) with the navigation solution, wherein the navigation solution is based at least in part on output of the motion sensors, wherein integrating uses a state estimation technique and comprises any one or any combination of:
      i. integrating the wireless measurements comprising the angle of arrival measurement(s) by providing updates to the navigation solution using the wireless measurement(s) comprising the angle of arrival measurement(s) directly in an update phase of the state estimation technique;
      ii. integrating the wireless measurements comprising the angle of arrival measurement(s) by providing updates to the navigation solution using the wireless measurement(s) comprising the angle of arrival measurement(s) directly in an update phase of the state estimation technique, calculating accuracy measure(s) of the wireless measurement(s), and utilizing the accuracy measure(s) for the integration with the navigation solution;
      iii. utilizing the navigation solution to build dynamic online wireless model(s) for the wireless measurement(s);
      iv. utilizing the navigation solution to verify dynamic online wireless model(s);
      v. utilizing the navigation solution to correct dynamic online wireless model(s);
      vi. utilizing the navigation solution to build dynamic online wireless model(s) for the wireless measurement(s) and utilizing the navigation solution to verify and correct the built dynamic online wireless model(s);
      vii. utilizing the navigation solution to build dynamic online wireless model(s) for the wireless measurement(s) and calculating a position of the at least one device using the wireless measurement(s), wherein integrating the wireless measurement(s) comprising the angle of arrival measurement(s) with the navigation solution comprises integrating the position with the navigation solution;
      viii. utilizing the navigation solution to verify and correct dynamic online wireless model(s) for the wireless measurement(s) and calculating a position of the at least one device using the wireless measurement(s), wherein integrating the wireless measurement(s) comprising the angle of arrival measurement(s) with the navigation solution comprises integrating the position with the navigation solution;
      ix. utilizing the navigation solution to build dynamic online wireless model(s) for the wireless measurement(s), calculating a position of the at least one device using the wireless measurement(s), wherein integrating the wireless measurement(s) comprising the angle of arrival measurement(s) with the navigation solution comprises integrating the position with the navigation solution, calculating an accuracy measure of the at least one device position, and utilizing the accuracy measure for the integration with the navigation solution;
      x. utilizing the navigation solution to verify and correct dynamic online wireless model(s) for the wireless measurement(s), calculating a position of the at least one device using the wireless measurement(s), wherein integrating the wireless measurement(s)

comprising the angle of arrival measurement(s) with the navigation solution comprises integrating the position with the navigation solution, calculating an accuracy measure of the at least one device position, and utilizing the accuracy measure for the integration with the navigation solution;

xi. integrating the wireless measurements comprising the angle of arrival measurement(s) by providing updates to the navigation solution using the wireless measurement(s) comprising the angle of arrival measurement(s) directly in an update phase of the state estimation technique and utilizing the navigation solution to build dynamic online wireless model(s) for the wireless measurement(s);

xii. integrating the wireless measurements comprising the angle of arrival measurement(s) by providing updates to the navigation solution using the wireless measurement(s) comprising the angle of arrival measurement(s) directly in an update phase of the state estimation technique and utilizing the navigation solution to verify and correct dynamic online wireless model(s) for the wireless measurement(s);

xiii. integrating the wireless measurements comprising the angle of arrival measurement(s) by providing updates to the navigation solution using the wireless measurement(s) comprising the angle of arrival measurement(s) directly in an update phase of the state estimation technique, utilizing the navigation solution to build dynamic online wireless model(s) for the wireless measurement(s), calculating accuracy measure(s) of the wireless measurement(s) and utilizing the accuracy measure(s) for the integration with the navigation solution;

xiv. integrating the wireless measurements comprising the angle of arrival measurement(s) by providing updates to the navigation solution using the wireless measurement(s) comprising the angle of arrival measurement(s) directly in an update phase of the state estimation technique, utilizing the navigation solution to verify and correct dynamic online wireless model(s) for the wireless measurement(s), calculating accuracy measure(s) of the wireless measurement(s) and utilizing the accuracy measure(s) for the integration with the navigation solution.

2. The method of claim 1, wherein the method further utilizes the wireless measurements comprising the angle of arrival measurement(s) to calculate a position of the at least one device, wherein integrating the wireless measurements comprises integrating the position with the navigation solution.

3. The method of claim 2, wherein the method calculates an accuracy measure of the at least one device position, and further utilizes the accuracy measure for the integration with the navigation solution.

4. The method of claim 1, wherein the method provides updates to the navigation solution using the wireless measurement(s) comprising the angle of arrival measurement(s) directly in an update phase of the state estimation technique.

5. The method of claim 4, wherein the method calculates accuracy measure(s) of the wireless measurement(s), and further utilizes the accuracy measure(s) for the integration with the navigation solution.

6. The method of claim 1, wherein the method utilizes the navigation solution to build dynamic online wireless model(s) for the wireless measurements.

7. The method of claim 6, wherein the method utilizes the navigation solution to verify and correct the built dynamic online wireless model(s).

8. The method of claim 1, wherein the method utilizes the navigation solution for at least one of:
a. building dynamic online wireless model(s) for the wireless measurements, and
b. building dynamic online wireless model(s) for the wireless measurements, and verifying and correcting the built wireless model(s), and wherein the method further calculates a position of the at least one device using the wireless measurements, and integrates the position with the navigation solution.

9. The method of claim 8, wherein the method calculates an accuracy measure of the at least one device position, and further utilizes the accuracy measure for the integration with the navigation solution.

10. The method of claim 1, wherein the method utilizes the navigation solution for at least one of:
a. building dynamic online wireless model(s) for the wireless measurements, and
b. building dynamic online wireless model(s) for the wireless measurements, and verifying and correcting the built wireless model(s), and wherein the method further provides updates to the navigation solution using the wireless measurement(s) directly in an update phase of the state estimation technique.

11. The method of claim 10, wherein the method calculates accuracy measure(s) of the wireless measurement(s), and further utilizes the accuracy measure(s) for the integration with the navigation solution.

12. The method of claim 1, wherein the method further utilizes the navigation solution for at least one of:
a. building dynamic online wireless model(s) for the wireless measurement(s), and
b. building dynamic online wireless model(s) for the wireless measurement(s), and verifying and correcting the built wireless model(s), wherein the method further performs at least one of:
a. calculating the position of the at least one device using the wireless measurements, and integrating the position with the navigation solution, and
b. providing updates to the navigation solution using the wireless measurement(s) directly in an update phase of the state estimation technique, and wherein the wireless model(s) are one of the following:
a. an online propagation model of the at least one transceiver means, wherein the propagation model relates received signal strength from the at least one transceiver means to a distance from the at least one transceiver means,
b. an online power profile of the at least one transceiver means, wherein the power profile relates received signal strength from the at least one transceiver means to a location in the wireless network area, and
c. a combination of the propagation model and the online power profile of the at least one transceiver means.

13. The method of claim 12, wherein the wireless model(s) are built using an adaptive, calibrated best-fit mathematical formula.

14. The method of claim 12, wherein the wireless model(s) are built using an adaptive, calibrated conditional probabilistic approach.

15. The method of claim 12, wherein the wireless model(s) are built using the combination of an adaptive, calibrated hybrid approach that combines a best fit mathematical model and a conditional probabilistic approach.

16. The method of claim 12, wherein the wireless model(s) undergo online, automatic, dynamic, and adaptive verification and correction.

17. The method of claim 12, wherein the wireless model(s) are built using at least one of:
   a. an adaptive, calibrated best-fit mathematical formula,
   b. an adaptive, calibrated conditional probabilistic approach, and
   c. a combination of an adaptive, calibrated hybrid approach that combines a best fit mathematical model and a conditional probabilistic approach, and
wherein the wireless models undergo online, automatic, dynamic, and adaptive verification and correction.

18. The method of any one of claim 1, 2, 4, 6, 7, 8, 10, 12, 16, or 17, wherein the method determines the location(s) of the at least one transceiver means using:
   a. a table containing the location(s) of the at least one transceiver means indexed by the information that identifies the at least one transceiver means, or
   b. by encoding the location(s) of the at least one transceiver means in the signal(s) transmitted by the at least one transceiver means.

19. The method of any one of claim 1, 2, 4, 6, 7, 8, 10, 12, 16, or 17, wherein the method calculates the location(s) of the at least one transceiver means.

20. The method of any one of claim 6, 7, 8, 10, 12, 16, or 17, wherein the method utilizes the navigation solution to determine the location(s) of the at least one transceiver means or assist in the determination of the locations(s) of the at least one transceiver means.

21. The method of any one of claim 1, 2, 4, 6, 7, 8, 10, 12, 16, or 17, wherein the signal(s) transmitted by the at least one transceiver means are broadcasted wirelessly or transmitted through a wired network to at least one processor.

22. The method of claim 1, wherein the at least one device communicates with at least one processor through:
   a. wireless communication,
   b. wired communication, or
   c. by embedding the at least one processor inside the at least one wireless-enabled device in a single device,
wherein the at least one processor is operative to integrate the wireless measurement(s) with the navigation solution.

23. The method of claim 1, wherein the method is further configured to rank the at least one transceiver means.

24. The method of claim 23, wherein the ranking of the at least one transceiver means is used to calculate accuracy measure(s) for the wireless measurement(s) from the at least one transceiver means.

25. The method of claim 24, wherein the integration of the wireless measurement(s) with the navigation solution utilizes the ranking of the at least one transceiver means.

26. The method of claim 1, wherein the method further comprises a pre-processing routine to de-noise the wireless signals or to smooth the wireless measurement(s).

27. The method of claim 1, wherein the method further performs a multipath assessment and rejection for the wireless signal(s) and measurement(s).

28. The method of claim 27, wherein the multipath assessment and rejection is performed using the navigation solution.

29. The method of claim 1, wherein the method further utilizes beamforming technique(s) to obtain the angle of arrival from each of the at least one transceiver means.

30. The method of claim 1, wherein the wireless measurement(s) further comprise one of the following:
   (i) received signal strength measurement(s) from the at least one transceiver means,
   (ii) time derivative of the received signal strength measurement(s) from the at least one transceiver means,
   (iii) both received signal strength measurement(s) from the at least one transceiver means and time derivative of the received signal strength measurement(s) from the at least one transceiver means.

31. A system for integrating measurements from a wireless system comprising at least angle of arrival measurement(s) with a navigation solution about at least one wireless-enabled device, wherein the wireless system comprises at least one transceiver means at any location within a wireless network area, wherein the at least one transceiver is configured to transmit wireless signal(s), wherein the measurements of the wireless system are generated from the signal(s), wherein the at least one device is configured to receive the signal(s) from the at least one transceiver means and wherein the at least one device comprises motion sensors, the system comprising:
   a. at least one transceiver means configured to transmit a wireless signal,
   b. at least one wireless-enabled device configured to receive the signal(s) from the at least one transceiver means, and
   c. at least one processor configured to receive the signal(s) transmitted from the at least one transceiver means and operative to:
      i. obtain information from the transmitted signal(s) that identifies the at least one transceiver means,
      ii. integrate the wireless measurement(s) with the navigation solution, wherein the wireless measurement(s) comprise the angle of arrival measurement(s), and wherein the navigation solution is based at least in part on output of the motion sensors, and wherein the integration uses a state estimation technique and comprises any one or any combination of:
         A. integrate the wireless measurements comprising the angle of arrival measurement(s) by providing updates to the navigation solution using the wireless measurement(s) comprising the angle of arrival measurement(s) directly in an update phase of the state estimation technique;
         B. integrate the wireless measurements comprising the angle of arrival measurement(s) by providing updates to the navigation solution using the wireless measurement(s) comprising the angle of arrival measurement(s) directly in an update phase of the state estimation technique, calculate accuracy measure(s) of the wireless measurement(s), and utilize the accuracy measure(s) for the integration with the navigation solution;
         C. utilize the navigation solution to build dynamic online wireless model(s) for the wireless measurement(s);
         D utilizing the navigation solution to verify dynamic online wireless model(s);
         E. utilize the navigation solution to correct dynamic online wireless model(s);
         F. utilize the navigation solution to build dynamic online wireless model(s) for the wireless measurement(s) and utilize the navigation solution to verify and correct the built dynamic online wireless model(s);
         G. utilize the navigation solution to build dynamic online wireless model(s) for the wireless measurement(s) and calculate a position of the at least one device using the wireless measurement(s), wherein integrating the wireless measurement(s)

comprising the angle of arrival measurement(s) with the navigation solution comprises integrating the position with the navigation solution;

H. utilize the navigation solution to verify and correct dynamic online wireless model(s) for the wireless measurement(s) and calculate a position of the at least one device using the wireless measurement(s), wherein integrating the wireless measurement(s) comprising the angle of arrival measurement(s) with the navigation solution comprises integrating the position with the navigation solution;

I. utilize the navigation solution to build dynamic online wireless model(s) for the wireless measurement(s), calculate a position of the at least one device using the wireless measurement(s), wherein integrating the wireless measurement(s) comprising the angle of arrival measurement(s) with the navigation solution comprises integrating the position with the navigation solution, calculate an accuracy measure of the at least one device position, and utilize the accuracy measure for the integration with the navigation solution;

J. utilize the navigation solution to verify and correct dynamic online wireless model(s) for the wireless measurement(s), calculate a position of the at least one device using the wireless measurement(s), wherein integrating the wireless measurement(s) comprising the angle of arrival measurement(s) with the navigation solution comprises integrating the position with the navigation solution, calculate an accuracy measure of the at least one device position, and utilize the accuracy measure for the integration with the navigation solution;

K. integrate the wireless measurements comprising the angle of arrival measurement(s) by providing updates to the navigation solution using the wireless measurement(s) comprising the angle of arrival measurement(s) directly in an update phase of the state estimation technique and utilize the navigation solution to build dynamic online wireless model(s) for the wireless measurement(s);

L. integrate the wireless measurements comprising the angle of arrival measurement(s) by providing updates to the navigation solution using the wireless measurement(s) comprising the angle of arrival measurement(s) directly in an update phase of the state estimation technique and utilize the navigation solution to verify and correct dynamic online wireless model(s) for the wireless measurement(s);

M. integrate the wireless measurements comprising the angle of arrival measurement(s) by providing updates to the navigation solution using the wireless measurement(s) comprising the angle of arrival measurement(s) directly in an update phase of the state estimation technique, utilize the navigation solution to build dynamic online wireless model(s) for the wireless measurement(s), calculate accuracy measure(s) of the wireless measurement(s) and utilize the accuracy measure(s) for the integration with the navigation solution;

N. integrate the wireless measurements comprising the angle of arrival measurement(s) by providing updates to the navigation solution using the wireless measurement(s) comprising the angle of arrival measurement(s) directly in an update phase of the state estimation technique, utilize the navigation solution to verify and correct dynamic online wireless model(s) for the wireless measurement(s), calculate accuracy measure(s) of the wireless measurement(s) and utilize the accuracy measure(s) for the integration with the navigation solution.

32. The system of claim 31, wherein the at least one processor is further operative to use the wireless measurements comprising the angle of arrival measurement(s) to calculate a position of the at least one device, wherein integrating the wireless measurements comprises integrating the position with the navigation solution.

33. The system of claim 32, wherein the at least one processor is further operative to calculate an accuracy measure of the at least one device position, and further to utilize the accuracy measure for the integration with the navigation solution.

34. The system of claim 31, wherein the at least one processor is operative to update the navigation solution using the wireless measurement(s) directly in an update phase of the state estimation technique.

35. The system of claim 34, wherein the at least one processor is operative to calculate accuracy measure(s) of the wireless measurement(s), and to utilize the accuracy measure(s) for the integration with the navigation solution.

36. The system of claim 31, wherein the at least one processor is operative to utilize the navigation solution to build dynamic online wireless model(s) for the wireless measurements.

37. The system of claim 36, wherein the at least one processor is operative to utilize the navigation solution to verify and correct the built dynamic online wireless model(s).

38. The system of claim 31, wherein the processor is operative to utilize the navigation solution for at least one of:
 a. building dynamic online wireless model(s) for the wireless measurements, and
 b. building dynamic online wireless model(s) for the wireless measurements, and verifying and correcting the built wireless model(s), and wherein the at least one processor is further operative to calculate a position of the at least one device using the wireless measurements, and to integrate the position with the navigation solution.

39. The system of claim 38, wherein the at least one processor is further operative to calculate an accuracy measure of the at least one device position, and to utilize the accuracy measure for the integration with the navigation solution.

40. The system of claim 31, wherein the processor is operative to utilize the navigation solution for at least one of:
 a. building dynamic online wireless model(s) for the wireless measurements, and
 b. building dynamic online wireless model(s) for the wireless measurements, and verifying and correcting the built wireless model(s), and wherein the at least one processor is further operative to update the navigation solution using the wireless measurement(s) directly in an update phase of the state estimation technique.

41. The system of claim 40, wherein the at least one processor is further operative to calculate accuracy measure(s) of the wireless measurement(s), and to utilize the accuracy measure(s) for the integration with the navigation solution.

42. The system of any one of claim 36, 37, 38, or 40, wherein the wireless model(s) are one of the following:
   a. an online propagation model of the at least one transceiver means, wherein the propagation model relates the received signal strength from the at least one transceiver means to a distance from the at least one transceiver means,
   b. an online power profile of the at least one transceiver means, wherein the power profile relates the received signal strength from the at least one transceiver means to a location in the wireless network area, or
   c. a combination of the propagation model and the online power profile of the at least one transceiver means.

43. The system of any one of claim 31, 32, 34, 36, 37, 38, or 40, wherein the signal(s) transmitted by the at least one transceiver means are broadcasted wirelessly or transmitted through a wired network to the at least one processor.

44. The system of claim 31, wherein the at least one device communicates with the at least one processor through:
   a. wireless communication,
   b. wired communication, or
   c. by embedding the at least one processor inside the at least one wireless-enabled device in a single device.

45. The system of claim 31, wherein the at least one device comprises means to obtain the angle of arrival from each of the at least one transceiver means.

46. The system of claim 31, wherein the at least one device comprises a wireless antenna enabling the device to obtain the angle of arrival from each of the at least one transceiver means.

47. The system of claim 31, wherein the at least one device comprises a wireless antenna structure comprising a plurality of antennas enabling the device to obtain the angle of arrival from each of the at least one transceiver means.

48. The system of claim 31, wherein the at least one device comprises means to utilizes beamforming technique(s) to obtain the angle of arrival from each of the at least one transceiver means.

49. The method of any one of claim 16 or 17, wherein the verification and the correction of the wireless model(s) occurs periodically.

50. The method of claim 18, wherein the signal(s) transmitted by the at least one transceiver means are broadcasted wirelessly or transmitted through a wired network to at least one processor.

51. The method of claim 19, wherein the signal(s) transmitted by the at least one transceiver means are broadcasted wirelessly or transmitted through a wired network to at least one processor.

52. The method of claim 20, wherein the signal(s) transmitted by the at least one transceiver means are broadcasted wirelessly or transmitted through a wired network to at least one processor.

53. The system of claim 42, wherein the signal(s) transmitted by the at least one transceiver means are broadcasted wirelessly or transmitted through a wired network to the at least one processor.

* * * * *